(12) United States Patent
Daigo et al.

(10) Patent No.: US 8,803,488 B2
(45) Date of Patent: Aug. 12, 2014

(54) POWER SUPPLY APPARATUS

(75) Inventors: Toru Daigo, Chiyoda-ku (JP); Nobuhiro Kihara, Chiyoda-ku (JP); Naoki Itoi, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 486 days.

(21) Appl. No.: 13/224,738

(22) Filed: Sep. 2, 2011

(65) Prior Publication Data

US 2012/0268972 A1 Oct. 25, 2012

(30) Foreign Application Priority Data

Apr. 25, 2011 (JP) ................................. 2011-097000

(51) Int. Cl.
*H02P 9/00* (2006.01)
*H02P 11/00* (2006.01)

(52) U.S. Cl.
USPC .............................................. 322/44; 322/24

(58) Field of Classification Search
USPC ........... 322/24, 28, 89, 44; 323/201; 320/128; 363/48
See application file for complete search history.

(56) References Cited

U.S. PATENT DOCUMENTS 5,767,591 A * 6/1998 Pinkerton ........................ 307/64
5,793,623 A * 8/1998 Kawashima et al. ....... 363/56.05
2002/0093320 A1 7/2002 Van Auken
2008/0315852 A1 * 12/2008 Jayaraman et al. ........... 323/285
2009/0040791 A1 2/2009 Qahouq et al.
2010/0164435 A1 7/2010 Bartling
2011/0194321 A1 * 8/2011 Amano et al. ................. 363/126

FOREIGN PATENT DOCUMENTS

DE      19923508 A1    11/2000
DE   102007041510 A1     3/2009
DE   112008002108 T5    12/2010
JP       2004-328834 A  11/2004

OTHER PUBLICATIONS

German Office Action, issued May 23, 2013, Patent Application No. 10 2011 084 604.2.
Wustehube et al Shaltnetzteile, 2nd revised edition, Expert Verlag:Grafenau, 1982, pp. 40-47.

* cited by examiner

*Primary Examiner* — Julio Gonzalez
(74) *Attorney, Agent, or Firm* — Sughrue Mion, PLLC

(57) ABSTRACT

A power supply apparatus capable of setting a ripple current to be not more than an acceptable value regardless of an input voltage is obtained. The apparatus calculates switching frequency by a current detected by a current detector so that the switching frequency is set to be low if the current is large and the switching frequency is set to be high if the current is small. The switching frequency is set to be high if the input voltage is high and switching frequency is set to be low if the input voltage is low depending on a voltage inputted to an input terminal; and a switching element is controlled by restricting the switching frequency so that the switching frequency to be set by the current detected by the current detector is not lower than the switching frequency to be set by the input voltage.

4 Claims, 7 Drawing Sheets

POWER SUPPLY APPARATUS

BACKGROUND OF THE INVENTION

1. Field of the Invention

The present invention relates to a power supply apparatus which transforms an input voltage and outputs a stable voltage and, more particularly, relates to a power supply apparatus which varies switching frequency that controls a switching element.

2. Description of the Related Art

Patent Document 1 showing a conventional example discloses one which reduces switching toss by fluctuating switching frequency to lower to the level of capable of switching during a high load period, and which can set the reactance value of a coil to an optimum value at the time of a low load and does not need to be set higher than necessary by returning the frequency to operate at stationary frequency during a low load period, by instructions from a microcomputer that controls the state of equipment.

[Patent Document 1] Japanese Unexamined Patent Publication No. 2004-328834 (Paragraph 0017)

In the aforementioned conventional example, in the case where the load is constant, the switching frequency that controls a switching element is also constant. However, in automobile generators and the like, there is a case where an input voltage to be inputted to an input terminal is not constant even when the load is constant. In this case, for example, the switching frequency is set to be low in a state where the load is large; and therefore, in the case where the input voltage is high, a problem exists in that, when the switching frequency is low, a ripple current increases and exceeds an acceptable value. Incidentally, when the ripple current exceeds the acceptable value, an output smoothing capacitor generates heat due to internal resistance of the (output) smoothing capacitor and the deterioration of the output smoothing capacitor accelerates. When the deterioration of the output smoothing capacitor advances, there are harmful effects in that the output smoothing capacitor cannot absorb the ripple current, the output of a power supply apparatus is unstable, and equipment connected to the power supply apparatus erroneously operates; and such harmful effects have to be avoided.

This invention has been made to solve the problem described above, and an object of the present invention is to provide a power supply apparatus which varies switching frequency when an input voltage fluctuates and can set a ripple current to be not more than an acceptable value regardless of the input voltage.

SUMMARY OF THE INVENTION

According to the present invention, there is provided a power supply apparatus including: a switching element which is connected to an input terminal and performs switching driving; a rectifying element; a reactor which smooths an input voltage transformed by the switching element and the rectifying element; a smoothing capacitor which smooths the output of the reactor; a current detector which detects an output current; and a switching control unit which calculates a duty ratio of the switching element by an output voltage and a target voltage, calculates switching frequency from a load state to be determined by the current detected by the current detector, and controls the switching element. The calculation of the switching frequency is performed by the current detected by the current detector so that the switching frequency is set to be low if the current is large and the switching frequency is set to be high if the current is small. The switching frequency is set to be high if the input voltage is high and the switching frequency is set to be low if the input voltage is low depending on the input voltage inputted to the input terminal, and the switching element is controlled by restricting the switching frequency so that the switching frequency to be set by the current detected by the current detector is not lower than the switching frequency to be set by the input voltage.

Furthermore, according to the present invention, there is provided a power supply apparatus including: a switching element which is connected to an input terminal and performs switching driving; a rectifying element; a reactor which smooths an input voltage transformed by the switching element and the rectifying element; a smoothing capacitor which smooths the output of the reactor; a current detector which detects an output current; and a switching control unit which calculates a duty ratio of the switching element by an output voltage and a target voltage, calculates switching frequency from a load state to be determined by the current detected by the current detector, and controls the switching element. The calculation of the switching frequency is performed by the current detected by the current detector so that the switching frequency is set to be low if the current is large and the switching frequency is set to be high if the current is small. The power supply apparatus further includes: a generator; and a power generation control unit which controls the generator when a direct current (DC) voltage obtained by rectifying an alternating current (AC) voltage outputted from the generator exceeds an acceptable range with respect to a set voltage. In the case where a signal that controls the generator is generated from the power generation control unit when exceeding the acceptable range, the switching control unit that receives the signal sets a top-level switching frequency capable of switching in place of the switching frequency to be set by the current detected by the current detector and controls the switching element.

According to a power supply apparatus of the present invention, switching frequency is restricted to be high if an input voltage is high and the switching frequency is restricted to be low if the input voltage is low; and accordingly, a constant ripple current can be outputted regardless of the input voltage. Therefore, in a state where the input voltage is high and a load is large, the switching frequency is set to be high and accordingly the ripple current can be not more than an acceptable value; and in a state where the input voltage is low and the load is large, the switching frequency can be set to be low and therefore a highly-efficient power supply apparatus can be obtained.

Furthermore, according to a power supply apparatus of the present invention, the power supply apparatus includes: a generator; and a power generation control unit which controls the generator when a DC voltage obtained by rectifying an AC voltage outputted from the generator exceeds an acceptable range with respect to a set voltage. In the case where a signal that controls the generator is generated from the power generation control unit when exceeding the acceptable range, the switching control unit that receives the signal sets a top-level switching frequency capable of switching in place of switching frequency to be set by a current detected by a current detector and controls a switching element. Therefore, even calculation equipment, which does not catch up with the fluctuation of an input voltage and is slow in calculation processing, can stably accept and can set not more than a ripple current value; furthermore, in a state where the input voltage is high and a load is large, the switching frequency is set to be high and accordingly a ripple current can be not more than an acceptable value; and the ripple current can be always not more than the acceptable value. Therefore, the size of a heatsink can be reduced and a small power supply apparatus can be obtained.

The foregoing and other objects, features, aspects and advantages of the present invention will become more apparent from the following detailed description of the present invention when taken in conjunction with the accompanying drawings.

DETAILED DESCRIPTION OF THE INVENTION

Preferred Embodiment 1

Figure 1:
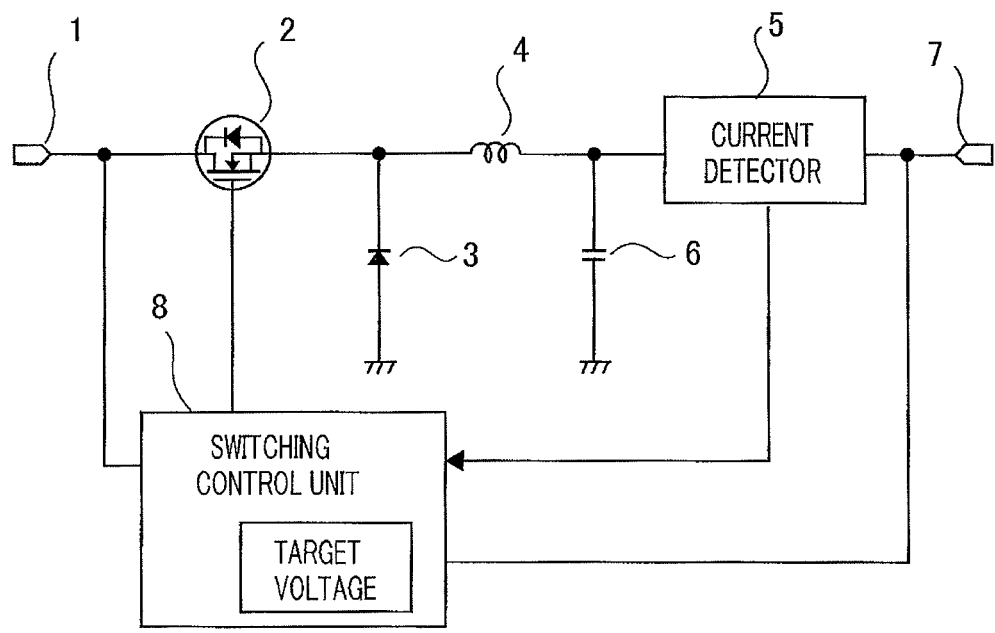
FIG. 1 is a block diagram showing the configuration of a power supply apparatus according to a preferred embodiment 1 of the present invention.

FIG. 1 is a block diagram showing the configuration of a power supply apparatus according to a preferred embodiment 1 of the present invention. In the drawing, the power supply apparatus includes a switching element 2 which is connected to an input terminal 1 and performs switching driving; a rectifying element 3 in which the anode side is grounded and the cathode side is connected to the output end of the switching element 2; a reactor 4 which is connected to the output end of the switching element 2 and smooths an input voltage transformed by the switching element 2 and the rectifying element 3; a current detector 5 which is located on the output side of the reactor 4 and detects an output current; a smoothing capacitor 6 which is connected between the output side of the reactor 4 and the ground and smooths the output of the reactor 4; and a switching control unit 8 which controls the switching element 2. The switching control unit 8 calculates a duty ratio and switching frequency of the switching element 2 using an input voltage inputted to the input terminal 1, a load state determined by the current detected by the current detector 5, and an output voltage to be outputted to an output terminal 7; and the switching control unit 8 controls the switching element 2.

When the switching control unit 8 controls the switching element 2 to be turned ON, a current flows through the reactor 4; and when the switching control unit 8 controls the switching element 2 to be turned OFF, a current flows from the rectifying element 3 to the reactor 4 by the back electromotive force of the reactor 4 and an output is obtained at the output terminal 7 by the smoothing capacitor. The longer an ON time of the switching element 2, the closer the output voltage to the input voltage; and the shorter the ON time of the switching element 2, the lower the output voltage than the input voltage. The timing of ON/OFF of the switching element 2 is determined by the switching frequency serving as the frequency of ON/OFF of the switching element 2 and the duty ratio (duty ratio=ON/cycle) serving as the ratio of ON and OFF of the switching element 2. The operation of the switching control unit B which controls the timing of ON/OFF of the switching element 2 will be described hereinafter.

Figure 2:
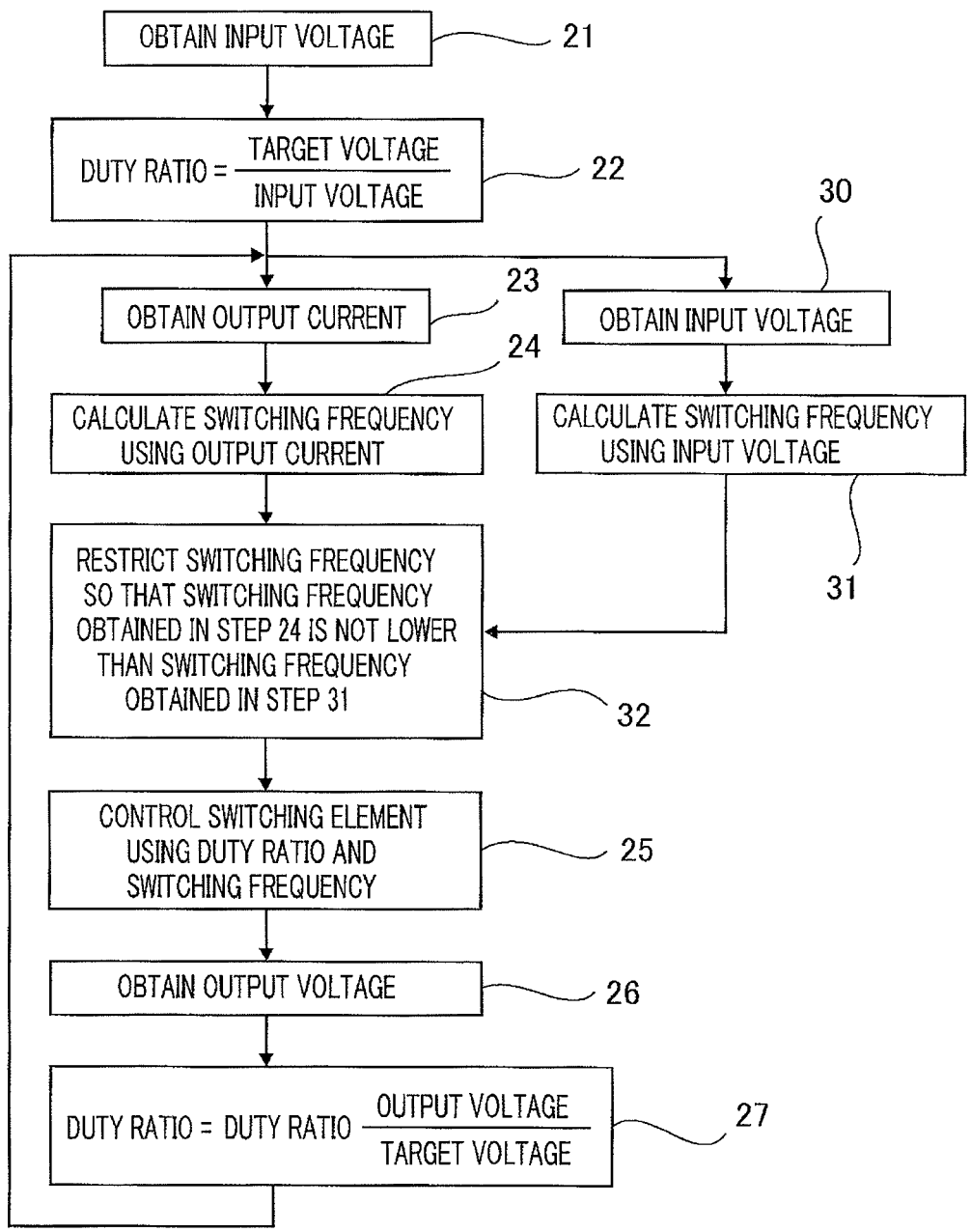
FIG. 2 is a flow chart showing the operation of a switching control unit in the power supply apparatus according to the preferred embodiment 1 of the present invention.

FIG. 2 is a flow chart showing the operation of the switching control unit in the power supply apparatus according to the preferred embodiment 1. Right after power on, the switching control unit 8 obtains an input voltage inputted from the input terminal 1 as a destabilization voltage (DC voltage of a generator or the like) for calculating a duty ratio, and calculates the duty ratio (= target voltage/input voltage) using the obtained input voltage and a target output voltage (set target voltage) (steps 21 and 22). Incidentally, a first (or initial) duty ratio shows calculation performed by using the input voltage and the target voltage; however, the calculation may be performed by giving a desired duty ratio.

Figure 3:
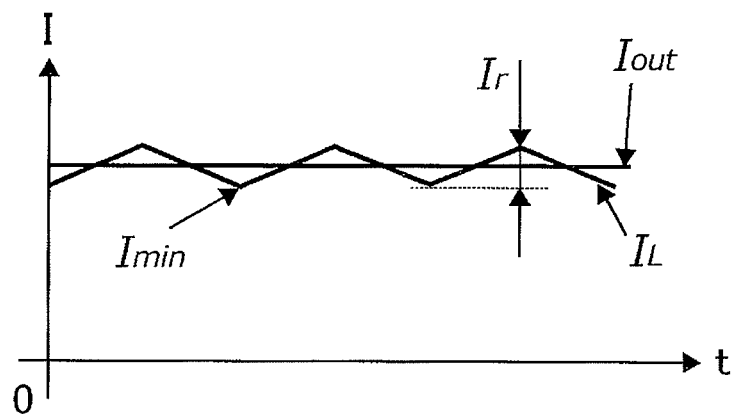
FIG. 3 is a view showing current versus time in the power supply apparatus according to the preferred embodiment 1 of the present invention.

After that, in order to efficiently control the output voltage to the target voltage, the switching control unit 8 obtains a current (output current) detected by the current detector 5 and sets switching frequency so as not to cause a current discontinuous mode with respect to the output current. At this point, the current discontinuous mode will be described with reference to FIG. 3. FIG. 3 shows current versus time. Reference mark $I_L$ denotes a reactor current flowing to the reactor 4, $I_{out}$ denotes an output current flowing to the output terminal 7, $I_r$ denotes a capacitor ripple current flowing to the smoothing capacitor 6, and $I_{min}$ denotes a minimum value ripple current. The current discontinuous mode represents a phenomenon that causes an interval in which the current does not flow to the reactor. The reactor current $I_L$ is intermittent in the current discontinuous mode; and therefore, a method of calculating a duty ratio in a current continuous mode in which the reactor current $I_L$ continuously flows is different from a method of calculating a duty ratio in the current discontinuous mode. In the case where switching is performed at the same timing as the current continuous mode, the amount of energy to be supplied to a load is excessive.

The calculation of the switching frequency which does not cause the current discontinuous mode will be described. The ripple current $I_r$ can be calculated in accordance with Equation (1) using input voltage $V_{in}$, output voltage $V_{out}$, capacitance Z of the reactor, duty ratio D, and switching frequency $f_{SW}$. The minimum value ripple current $I_{min}$ can be calculated in accordance with Equation (2). If the minimum value ripple current $I_{min}$ is not a minus value, the reactor current $I_L$ flows continuously; and therefore, condition which does not cause the current discontinuous mode is Equation (3). From this, the switching frequency $f_{SW}$ can be calculated by Equation (4)

[Equation 1]

$$I_r = \frac{(V_{in} - V_{out})}{L} \cdot D \cdot \frac{1}{f_{SW}} \quad (1)$$

$$I_{min} = I_{out} - \frac{1}{2}I_r \quad (2)$$

$$I_{min} \geq 0 \quad (3)$$

$$f_{SW} \geq \frac{(V_{in} - V_{out})D}{2I_{out}L} \quad (4)$$

Figure 4:
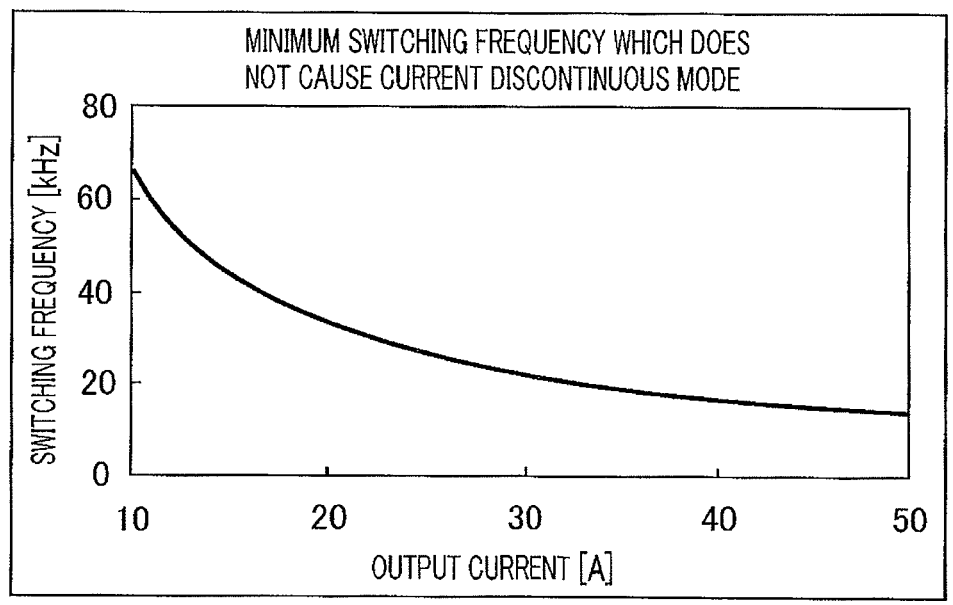
FIG. 4 is a view showing a setting example of switching frequency versus the fluctuation of output current in the power supply apparatus according to the preferred embodiment 1 of the present invention.

The switching frequency is calculated so as not to cause the current discontinuous mode from the state of an output current (steps 23 and 24). At this time, in a state where the current is high and the load is large, the switching frequency can be low; and therefore efficiency can be improved (switching loss can be reduced). For example, if Equation (4) is used, the switching frequency $f_{SW}$ can be calculated in the case where the output voltage $V_{out}$ is 10V, the capacitance L of the reactor is 5 μH (=5×10⁻⁶ H), the duty ratio D is $V_{out}/V_{in}$, the input voltage $V_{in}$ is 30 V, and the output current $I_{out}$ is 6 A to 50 A. FIG. 4 is a view showing a setting example of switching frequency [kHz] versus the fluctuation of output current [A] in that case.

Furthermore, after the process of the step 22, in parallel to the steps 23 and 24, the input voltage inputted from the input terminal 1 is obtained for calculating the switching frequency and the switching frequency is calculated so that the ripple current does not exceed acceptable amount using the obtained input voltage (steps 30 and 31).

At this point, the calculation of the switching frequency in which the ripple current does not exceed the acceptable amount with respect to the input voltage will be described. From Equation (1) showing the ripple current $I_r$, the switching frequency $f_{SW}$ can be calculated by Equation (5).

[Equation 2]

$$f_{SW} = \frac{(V_{in} - V_{out}) \cdot D}{I_r \cdot L} \quad (5)$$

Figure 5:
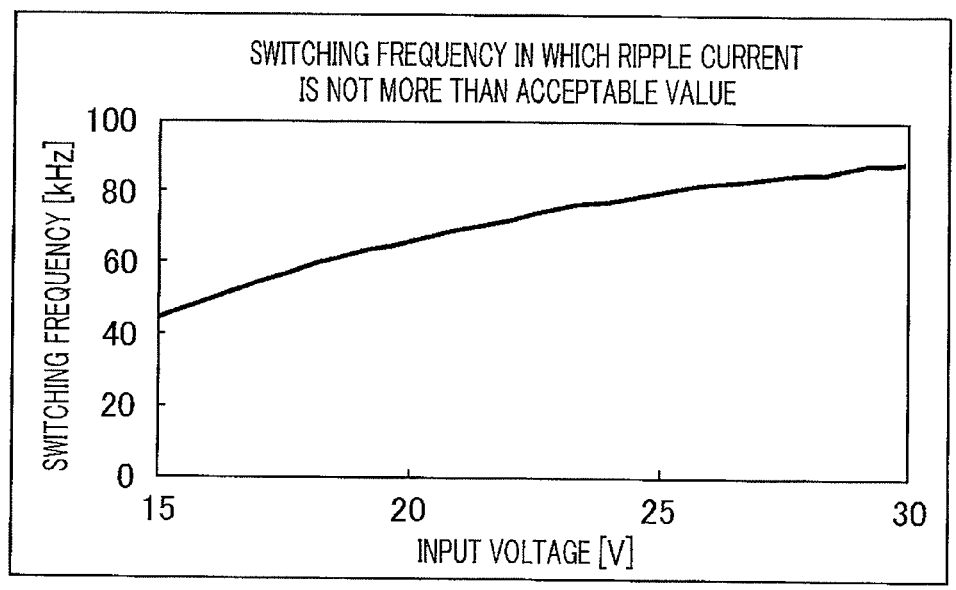
FIG. 5 is a view showing a setting example of switching frequency versus the fluctuation of input voltage in the power supply apparatus according to the preferred embodiment 1 of the present invention.

For example, if Equation (5) is used, the switching frequency $f_{SW}$ can be calculated in the case where the acceptable ripple current $I_r$ is 15 A, the output voltage $V_{out}$ is 10 V, the capacitance L of the reactor is 5 μh (=5×10⁻⁶ H), the duty ratio D is $V_{out}/V_{in}$, the input voltage $V_{in}$ is 15 V to 30 V. FIG. 5 is a view showing a setting example of the switching frequency [kHz] versus the fluctuation of the input voltage [V] in that case.

Next, the switching control unit 8 restricts the switching frequency so that the switching frequency calculated using the current detected by the current detector 5 is not lower than the switching frequency calculated using the input voltage inputted from the input terminal 1 (step 32).

The switching element 2 is controlled using the duty ratio (duty ratio calculated in step 22) and the switching frequency calculated in the above-mention (step 25). Finally, the switching control unit 8 updates the duty ratio to a duty ratio (duty ratio×output voltage/target voltage) using the output voltage and the target voltage obtained by the output terminal 7 (step 26 and 27). The steps 23 to 27 and the steps 30 to 32 are repeatedly performed; and accordingly, a stable voltage can be supplied.

As described above, according to the preferred embodiment 1, in the switching frequency set from the load state, the switching frequency is set to be high when the input voltage is high and the switching frequency is restricted to be low when the input voltage is low; and accordingly, a constant ripple current can be outputted regardless of the input voltage. Therefore, in a state where the input voltage is high and the load is large, the switching frequency is set to be high and accordingly the ripple current can be not more than an acceptable value; and in a state where the input voltage is low and the load is large, the switching frequency can be set to be low and thus highly efficient and the ripple current can be usually not more than the acceptable value. As a result, the size of a heatsink can be reduced and a small power supply apparatus can be obtained.

Preferred Embodiment 2

Figure 6:
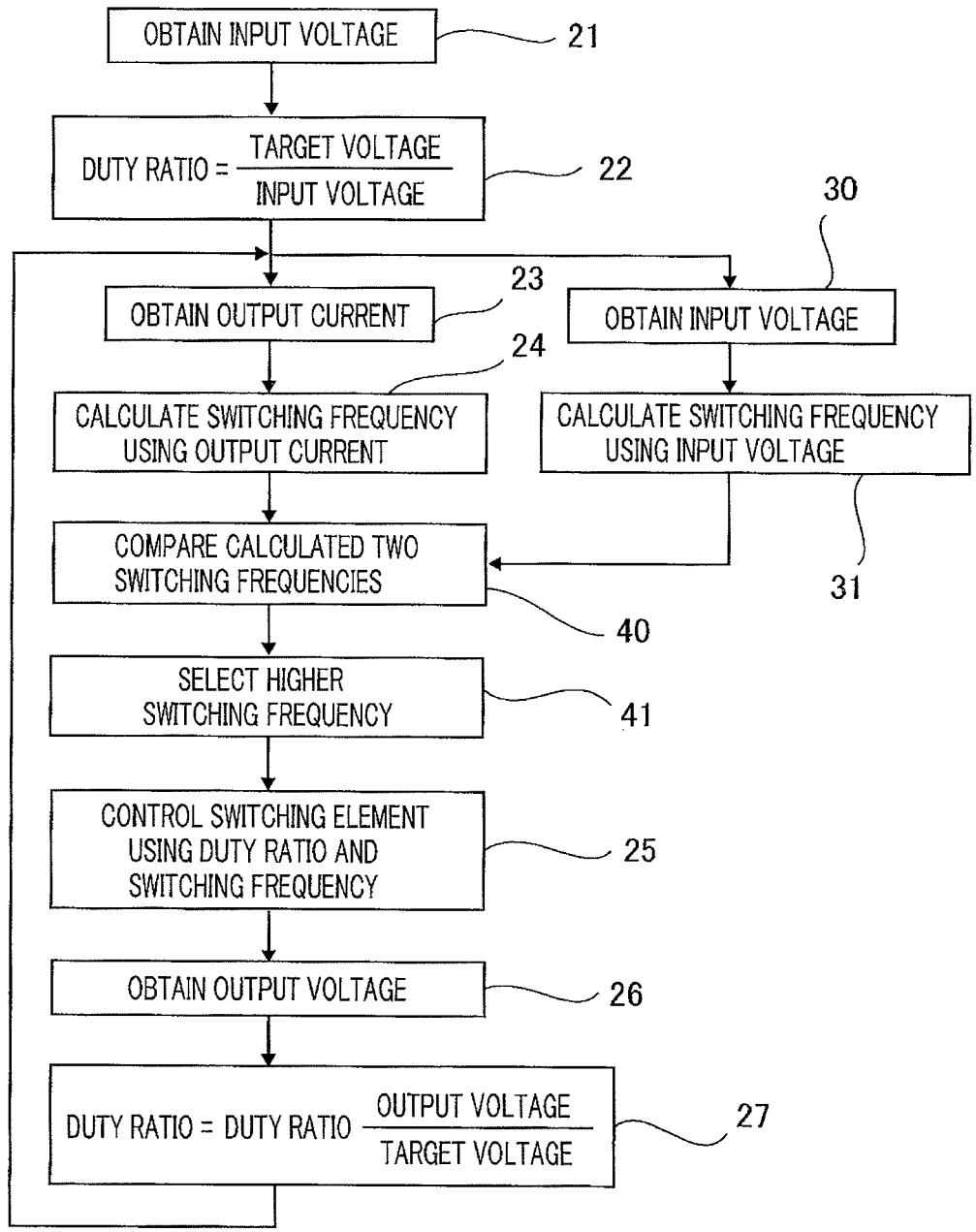
FIG. 6 is a flow chart showing the operation of a switching control unit in a power supply apparatus according to a preferred embodiment 2 of the present invention.

FIG. 6 is a flowchart showing the operation of a switching control unit in a power supply apparatus according to a preferred embodiment 2. Incidentally, the same reference numerals as those in the respective drawings represent the same or corresponding elements. As shown in FIG. 6, a switching control unit 8 obtains an input voltage inputted from an input terminal 1 for calculating switching frequency in parallel to steps 23 and 24 after the process of the step 22, and calculates the switching frequency so that a ripple current does not exceed acceptable amount using the obtained input voltage as in the preferred embodiment 1 (steps 30 and 31).

Next, the switching control unit 8 compares switching frequency calculated using a current detected by a current detector 5 with switching frequency calculated using the input voltage inputted from the input terminal 1, and selects higher switching frequency in both frequencies as a final switching frequency (steps 40 and 41). Next steps 25 to 27 are made to operate as in the preferred embodiment 1. After that, the steps 23 to 27, the steps 30 and 31, and the steps 40 and 41 are repeatedly performed; and accordingly, a stable voltage can be supplied.

As described above, according to the preferred embodiment 2, calculation is performed so that the switching frequency is set to be low in a state where a load is large and the switching frequency is set to be high in a state where the load is small; calculation is performed so that the switching frequency is set to be high when the input voltage is high and calculation is performed so that the switching frequency is set to be low when the input voltage is low; the switching frequency obtained in a load state is compared with the switching frequency obtained in an input voltage state; and higher switching frequency in both frequencies is selected and accordingly a constant ripple current can be outputted regardless of the input voltage. Therefore, in a state where the input voltage is high and the load is large, the switching frequency is set to be high and accordingly the ripple current can be not more than an acceptable value; and in a state where the input voltage is low and the load is large, the switching frequency can be set to be low and thus highly efficient and the ripple current can be usually not more than the acceptable value. As a result, the size of a heatsink can be reduced and a small power supply apparatus can be obtained.

Preferred Embodiment 3

Figure 7:
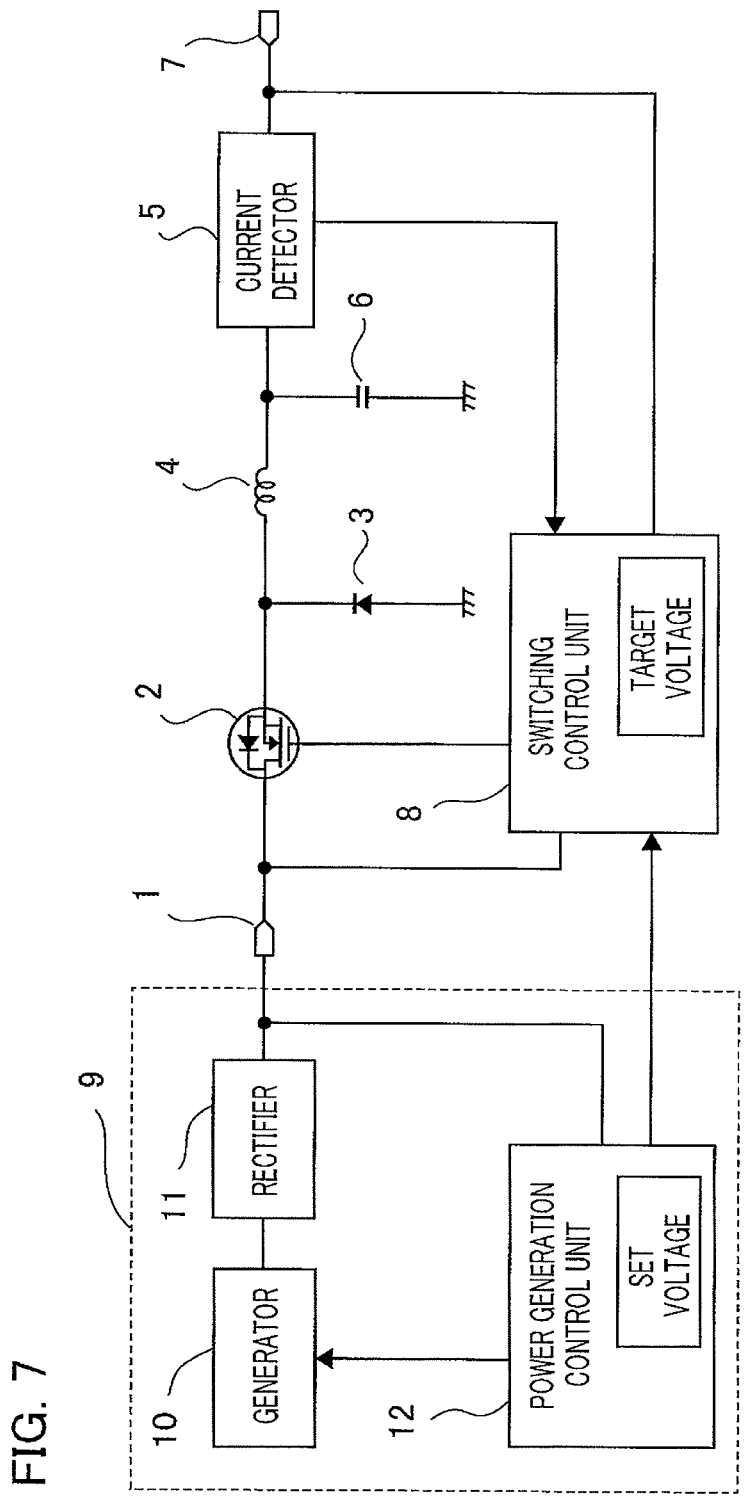
FIG. 7 is a block diagram showing the configuration of a power supply apparatus according to a preferred embodiment 3 of the present invention.

FIG. 7 is a block diagram showing the configuration of a power supply apparatus according to a preferred embodiment 3. In the power supply apparatus, constituent elements 1 to 8 are the same as the configuration of the preferred embodiment 1 except for the operation of the switching control unit 8. A power generation apparatus 9 includes a generator 10 which outputs an AC voltage, a rectifier 11 which rectifies the AC voltage outputted by the generator 10 and outputs a DC voltage, and a power generation control unit 12 which monitors the DC voltage outputted by the rectifier 11 and controls the number of rotation of the generator 10 so that the DC voltage is a set voltage.

The operation of the power generation apparatus 9 will be described. The generator 10 can freely change the number of rotation by an external command and outputs the AC voltage proportional to the number of rotation. The power generation control unit 12 commands to the generator 10 so as to increase the rotation in the case where a value, in which the DC voltage outputted by the rectifier 11 is subtracted from the target set voltage, is positively larger than a positive and negative threshold value that can accept the fluctuation of the voltage; and the power generation control unit 12 commands to the generator 10 so as to decrease the rotation in the case where the value, in which the DC voltage outputted by the rectifier 11 is subtracted from the set voltage, is negatively larger than the threshold value that can accept the fluctuation of the voltage. At this time, that is, when the DC voltage obtained by rectifying the AC voltage outputted by the generator 10 exceeds an acceptable range with respect to the set voltage, the power generation control unit 12 outputs to the switching control unit 8 a signal (hereinafter, referred to as a changing signal of power generation amount) which shows that the power generation control unit 12 commands to the generator 10. Furthermore, an interval in which the changing signal of power generation amount is outputted is an interval in which the DC voltage obtained by rectifying the AC voltage outputted by the generator 10 exceeds the acceptable range with respect to the set voltage.

In the case where the value, in which the DC voltage outputted by the rectifier 11 is subtracted from the set voltage, is within the threshold value (acceptable range) that can accept the fluctuation of the voltage, the power generation control unit 12 does not command to the generator 10. At this time, the power generation control unit 12 does not output the changing signal of power generation amount to the switching control unit 8.

Figure 8:
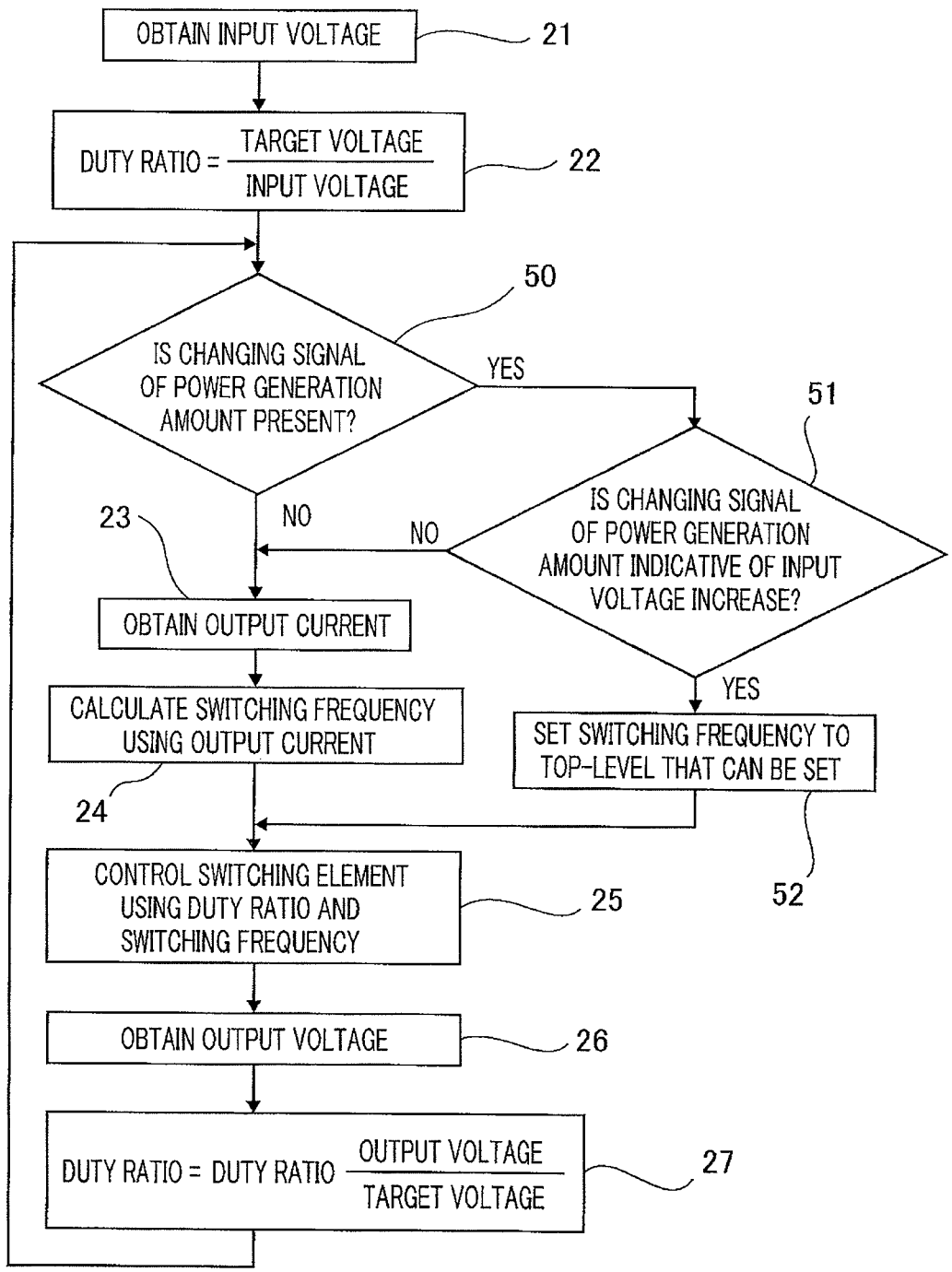
FIG. 8 is a flow chart showing the operation of a switching control unit in the power supply apparatus according to the preferred embodiment 3 of the present invention.

FIG. 8 is a flow chart showing the operation of the switching control unit in the power supply apparatus according to the preferred embodiment 3. The description of steps labeled with the same numerals as those of the preferred embodiment 1 will not be repeated. The presence or absence of a changing signal of power generation amount is determined in a step 50 following a step 22. In the case where the changing signal of power generation amount is absent, the switching control unit 8 performs steps 23 to 27 and returns to the step 50 again. This process is repeatedly performed; and accordingly, a stable voltage can be supplied.

Next, description will be made on the case where the changing signal of power generation amount is present and information of the changing signal of power generation amount increases the rotation, that is, increases power generation amount and raises a voltage to be inputted to the input terminal 1. The switching control unit 8 determines the information of the changing signal of power generation amount in a step 51 following the step 50. In the case where the changing signal of power generation amount is indicative of the information of an input voltage increase, the switching control unit 8 sets a top-level switching frequency (high frequency) for capable of switching regardless of a load state and the input voltage (step 51). After that, the switching control unit 8 performs the steps 25 to 27 and returns to the step 50 again. This process is repeatedly performed; and accordingly, a stable voltage can be supplied. The top-level switching frequency is switching frequency in which a maximum input voltage assumed in designing is substituted for the input voltage $V_{in}$ of Equation (5) and is calculated.

Next, in the case where the changing signal of power generation amount is present and the information of the changing signal of power generation amount decreases the rotation, that is, decreases power generation amount and lowers the voltage to be inputted to the input terminal 1, the switching control unit 8 performs the steps 23 to 27 and returns to the step 50 as in the case where the changing signal of power generation amount is absent. This process is repeatedly performed; and accordingly, a stable voltage can be supplied.

As described above, when the switching control unit 8 receives the changing signal of power generation amount, that is, when the input voltage exceeds the acceptable range and fluctuates, the switching control unit 8 determines that the input voltage is high when the input voltage fluctuates from a low state to a high state. Under ordinary circumstances, the switching control unit 8 changes the switching frequency from the low sate to the high state; however, in the case where calculation processing of the switching control unit 8 is slow, the switching control unit 8 does not catch up with the fluctuation of the input voltage and the switching control unit B controls the switching element 2 at low switching frequency in the state where the input voltage is high; and accordingly, a ripple current increases. At the time when the input voltage fluctuates, the switching frequency is preliminarily set to be high; and accordingly, the ripple current can be not more than an acceptable value. Furthermore, in a state where the input voltage is high and the load is large, the switching frequency is set to be high; and accordingly, the ripple current can be not more than the acceptable value. The ripple current can be always not more than the acceptable value; and therefore, the deterioration of a smoothing capacitor can be prevented and a stable power supply apparatus can be obtained.

Incidentally, in the preferred embodiment, the switching control unit B can be achieved by combining a microcomputer and a gate driver integrated circuit (IC) or the like; a current detector can be achieved by using one in which a shunt resistor and an amplifier are combined and by using a hall type current detection integrated circuit (IC) or the like; and the power generation control unit 12 can be achieved by using a microcomputer. Furthermore, a diode is shown as a rectifying element 3, but not limited thereto, because rectification can be performed by a switching element such as a metal oxide semiconductor field effect transistor (MOSFET) and an insulated gate bipolar transistor (IGBT).

While the presently preferred embodiments of the present invention have been shown and described. It is to be understood that these disclosures are for the purpose of illustration and that various changes and modifications may be made without departing from the scope of the invention as set forth in the appended claims.

What is claimed is:

1. A power supply apparatus comprising:
    a switching element which is connected to an input terminal and performs switching driving;
    a rectifying element;
    a reactor which smoothes an input voltage transformed by said switching element and said rectifying element;
    a smoothing capacitor which smoothes the output of said reactor;
    a current detector which detects an output current; and
    a switching control unit which calculates a duty ratio of said switching element by an output voltage and a target voltage, calculates switching frequency from a load state to be determined by the current detected by said current detector, and controls said switching element,
    the calculation of the switching frequency being performed by the current detected by said current detector so that the switching frequency is set to be low if the current is large and the switching frequency is set to be high if the current is small, wherein the switching frequency is set to be high if the input voltage is high and the switching frequency is set to be low if the input voltage is low depending on the input voltage inputted to said input terminal, and said switching element is controlled by restricting the switching frequency so that the switching frequency to be set by the current detected by said current detector is not lower than the switching frequency to be set by the input voltage.

2. The power supply apparatus according to claim 1, wherein said switching element is controlled such that the switching frequency to be set by the current detected by said current detector is compared with the switching frequency to be set by the input voltage and higher switching frequency is selected.

3. The power supply apparatus according to claim 1, wherein said switching element has an initial duty ratio which is calculated by the input voltage inputted from said input terminal and the target voltage.

4. The power supply apparatus according to claim 2, wherein said switching element has an initial duty ratio which is calculated by the input voltage inputted from said input terminal and the target voltage.

* * * * *